(12) United States Patent
Kolbet et al.

(10) Patent No.: US 8,095,337 B2
(45) Date of Patent: Jan. 10, 2012

(54) METHODS AND SYSTEMS FOR COMPUTATION OF PROBABILISTIC LOSS OF FUNCTION FROM FAILURE MODE

(75) Inventors: David Kolbet, Scottsdale, AZ (US); Qingqiu Ginger Shao, Oro Valley, AZ (US); Randy Magnuson, Scottsdale, AZ (US); Bradley John Barton, Albuquerque, NM (US); Akhilesh Maewal, San Diego, CA (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 12/244,637

(22) Filed: Oct. 2, 2008

(65) Prior Publication Data

US 2010/0088538 A1   Apr. 8, 2010

(51) Int. Cl.
*G06F 11/30* (2006.01)
(52) U.S. Cl. ................................................ 702/182
(58) Field of Classification Search .......... 702/179–183, 702/185, 189; 707/722–723, 735, 748–752; 700/29–35
See application file for complete search history.

(56) References Cited

U.S. PATENT DOCUMENTS

| | | | |
|---|---|---|---|
| 4,970,725 A | 11/1990 | McEnroe et al. | |
| 6,405,108 B1 | 6/2002 | Patel et al. | |
| 6,480,770 B1 | 11/2002 | Wischmeyer | |
| 6,574,537 B2 | 6/2003 | Kipersztok et al. | |
| 6,615,367 B1 | 9/2003 | Unkle et al. | |
| 6,662,089 B2 | 12/2003 | Felke et al. | |
| 6,748,304 B2 | 6/2004 | Felke et al. | |
| 6,751,536 B1 | 6/2004 | Kipersztok et al. | |
| 6,765,593 B2 | 7/2004 | Simmons | |
| 7,055,062 B2 | 5/2006 | Shah et al. | |
| 2003/0167111 A1 | 9/2003 | Kipersztok et al. | |
| 2003/0171897 A1* | 9/2003 | Bieda et al. | 702/185 |
| 2004/0260678 A1* | 12/2004 | Verbowski et al. | 707/3 |
| 2005/0028033 A1* | 2/2005 | Kipersztok et al. | 714/27 |
| 2007/0294001 A1* | 12/2007 | Underdal et al. | 701/29 |
| 2009/0216584 A1* | 8/2009 | Fountain et al. | 705/7 |
| 2009/0240471 A1* | 9/2009 | Novis | 702/183 |

OTHER PUBLICATIONS

Fenton et al.; Fault Diagnosis of Electronic Systems Using Intelligent Techniques: A Review; IEEE Transactions on Systems, Man, and Cybernetics: Part C: Applications and Review, IEEE Service Center, Piscataway, NJ, US, vol. 31, No. 3, Aug. 1, 2001, XP011057254.
IEEE Guide for General Principles of Reliability Analysis of Nuclear Power Generating Station Safety Systems; ANSI/IEEE Std 352-1987, IEEE Standard, IEEE, Piscataway, NJ, US, Jan. 1, 1987, pp. 1-47, XP017602607.
EP Search Report, EP 09167032.3-1225/2172881 dated Feb. 17, 2011.

* cited by examiner

*Primary Examiner* — Mohamed Charioui
(74) *Attorney, Agent, or Firm* — Ingrassia Fisher & Lorenz, P.C.

(57) ABSTRACT

A method for determining a probabilistic loss of function of a system includes the steps of determining a plurality of failure mode probabilities, ranking a plurality of functions pertaining to the failure mode probabilities, and identifying a likely function at least substantially lost by the system based at least in part on the plurality of failure mode probabilities and the ranking.

20 Claims, 7 Drawing Sheets

```
function results=BordaRank(A,B)
SizeA=size(A);
Size B=size( B);
lengthA=SizeA(1,2);
length B=Size B(1,2);
Brank=zeros(SizeA);
if lengthA==lengthB
    [rA indexA]=sort(A);
    [rB indexB]=sort(B);
    for i=1:length
        for k=1:lengthA
            if indexA(i)== indexB(k)
                        Brank(indexA(i))=i+k
            end
        end
    end
    [r3 index]=sort(Brank,descend);
    for i=1:length
        Brank(index(i))=i;
    end
end
result(1,:) =Brank;
result(2,:) = r3;
```

FIG. 6

METHODS AND SYSTEMS FOR COMPUTATION OF PROBABILISTIC LOSS OF FUNCTION FROM FAILURE MODE

STATEMENT REGARDING FEDERALLY SPONSORED RESEARCH OR DEVELOPMENT

This invention was made with Government support under contract number W56HZV-05-C-0724 awarded by the United States Army. The Government has certain rights in this invention.

TECHNICAL FIELD

The present invention relates to systems, and more particularly relates to methods and systems for computation of loss of function of systems.

BACKGROUND

Methods and systems are often utilized today in assessing potential failure modes of various types of systems. Such methods and systems generally utilize operating data in identifying a likely failure mode, if any, for the system being tested. Certain methods and techniques may also utilize the identification of the likely failure mode in further identifying a likely loss of function, if any, for the system.

However, it may often be difficult to identify such a failure mode and such a likely loss of function with certainty. Accordingly, it is desirable to provide an improved method for computation of loss of function of systems, for example that better incorporates uncertainties stemming from the data or from other services. It is also desirable to provide an improved program product and an improved system for such computation of loss of function of systems. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment of the present invention, method for determining a probabilistic loss of function of a system is disclosed. The method comprises the steps of determining a plurality of failure mode probabilities, ranking a plurality of functions pertaining to the failure mode probabilities, and identifying a likely function at least substantially lost by the system based at least in part on the plurality of failure mode probabilities and the ranking.

In accordance with another exemplary embodiment of the present invention, a program product for determining a probabilistic loss of function of a system is disclosed. The program product comprises a program and a computer-readable signal bearing medium. The program is configured to at least facilitate determining a plurality of failure mode probabilities, ranking a plurality of functions pertaining to the failure mode probabilities, and identifying a likely function at least substantially lost by the system based at least in part on the plurality of failure mode probabilities and the ranking. The computer-readable signal bearing medium bears the program.

In accordance with a further exemplary embodiment of the present invention, a computer system for determining a probabilistic loss of function of a system is disclosed. The computer system comprises an interface and a processor. The interface is configured to at least facilitate obtaining operating data for the system. The process is coupled to the interface, and is configured to at least facilitate determining a plurality of failure mode probabilities based at least in part on the operating data, ranking a plurality of functions pertaining to the failure mode probabilities, and identifying a likely function at least substantially lost by the system based at least in part on the plurality of failure mode probabilities and the ranking.

BRIEF DESCRIPTION OF THE DRAWINGS

FIG. 6 is a diagram of a computer MATLAB script for performing Borda rankings, and that can be utilized in connection with the process of FIG. 1, in accordance with an exemplary embodiment of the present invention;

DETAILED DESCRIPTION

Figure 1:
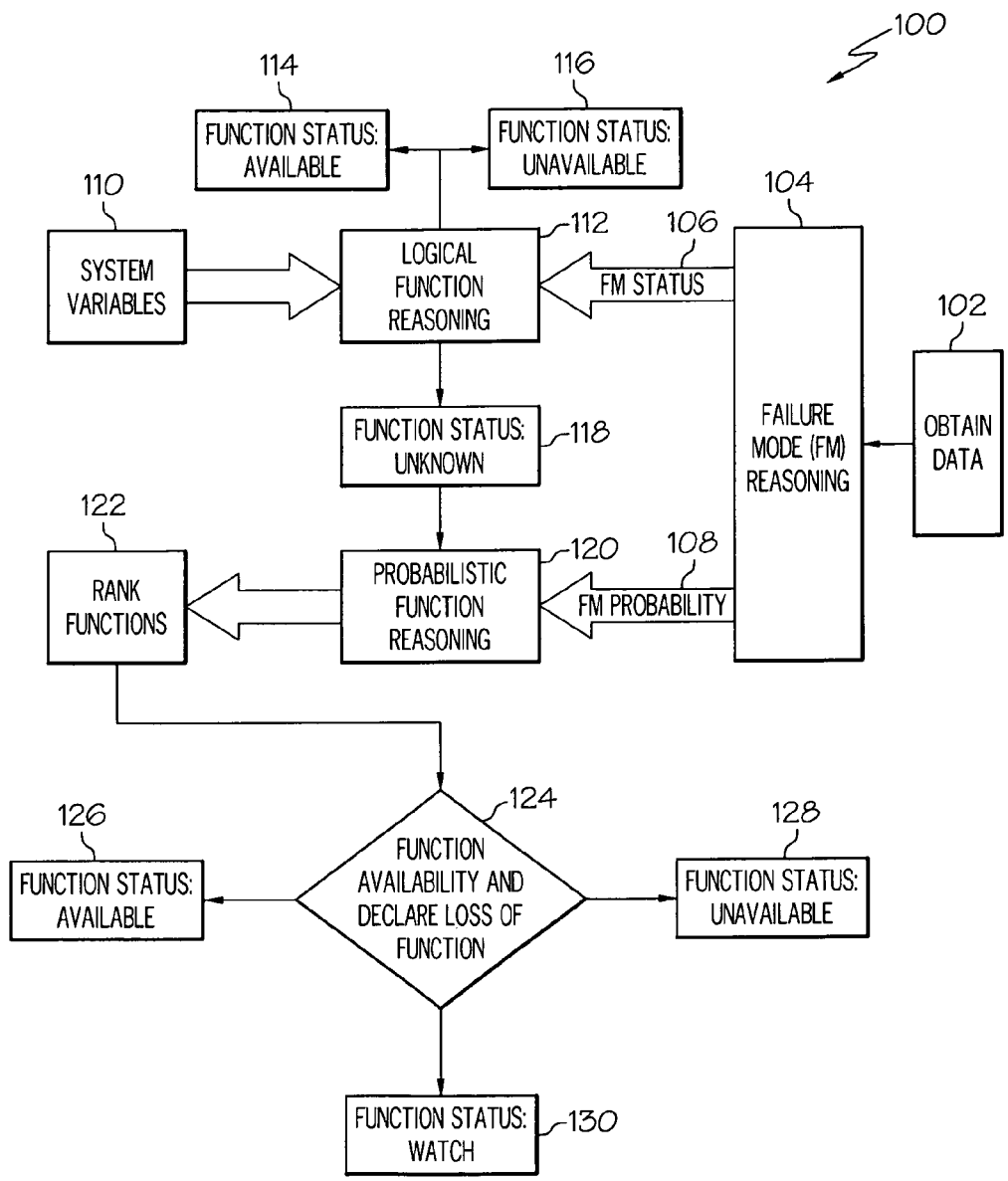
FIG. 1 is a flowchart of a process for determining a probabilistic loss of function of a system, in accordance with an exemplary embodiment of the present invention.

FIG. 1 is a flowchart of a process 100 for determining a probabilistic loss of function of a system, in accordance with an exemplary embodiment of the present invention. As shown in FIG. 1, the process 100 begins with the step of obtaining data (step 102). In a preferred embodiment, the data comprises operating data pertaining to the system. Also in a preferred embodiment, the data is obtained from the system via an interface, such as the interface 908 of FIG. 9 and described further below. In one exemplary embodiment, the system comprises a vehicle. In other exemplary embodiments, the system comprises any one or more of a number of other different types of devices and/or systems.

The data is then used in performing failure mode reasoning (step 104). In a preferred embodiment, the failure mode reasoning provides analysis as to various potential failure modes for the system, based at least in part on the data. Also in a preferred embodiment, the failure mode reasoning is performed by a processor, such as the processor 902 of FIG. 9 and described further below in connection therewith.

Next, a failure mode status is determined (step 106). In a preferred embodiment, the failure mode status a likely failure mode for the system, based on the failure mode reasoning and the data. Also in a preferred embodiment, the failure mode status is determined by a processor, such as the processor 902 of FIG. 9 and described further below in connection therewith.

In addition, one or more failure mode probabilities are determined (step 108). In a preferred embodiment, each failure mode probability comprises a measure of likelihood or a probability that the engine is experiencing a particular failure mode, based on the failure mode reasoning and the data. Also in a preferred embodiment, a number of such failure mode probabilities are determined in step 108 as to a corresponding number of possible failure modes, each such failure mode probability representing a measure of likelihood or a probability that the engine is experiencing a particular corresponding failure mode, based on the failure mode reasoning and the data. In addition, also in a preferred embodiment, the failure mode probabilities are determined by a processor, such as the processor 902 of FIG. 9 and described further below in connection therewith.

It will be appreciated that, in various embodiments, step 106 may be conducted before step 108, while in other embodiments step 106 may be conducted after step 108. In yet other embodiments, steps 106 and 108 may be conducted simultaneously, in whole or in part. It will similarly be appreciated that various other steps of the process 100 of FIG. 1 may be conducted simultaneously to one another and/or in a different order than that depicted in FIG. 1 and/or described herein in connection therewith in various embodiments of the present invention.

Next, logical function reasoning is conducted (step 112). In a preferred embodiment, the logical function reasoning utilizes the failure mode status of step 106 along with any other system variables 110 (e.g., pertaining to environmental conditions and/or past or present operating variables pertaining to the system and/or other systems similar thereto) in assessing whether a particular system function is available. If it is determined in step 112 that a particular system function is available, then a function status: available reading is provided (step 114). Conversely, if it is determined in step 112 that a particular system function is not available, then a function status: unavailable reading is provided (step 116). In addition, if it is determined in step 112 that it is unknown whether a particular system function is available, then a system status: unknown reading is provided (step 118).

Figure 2:
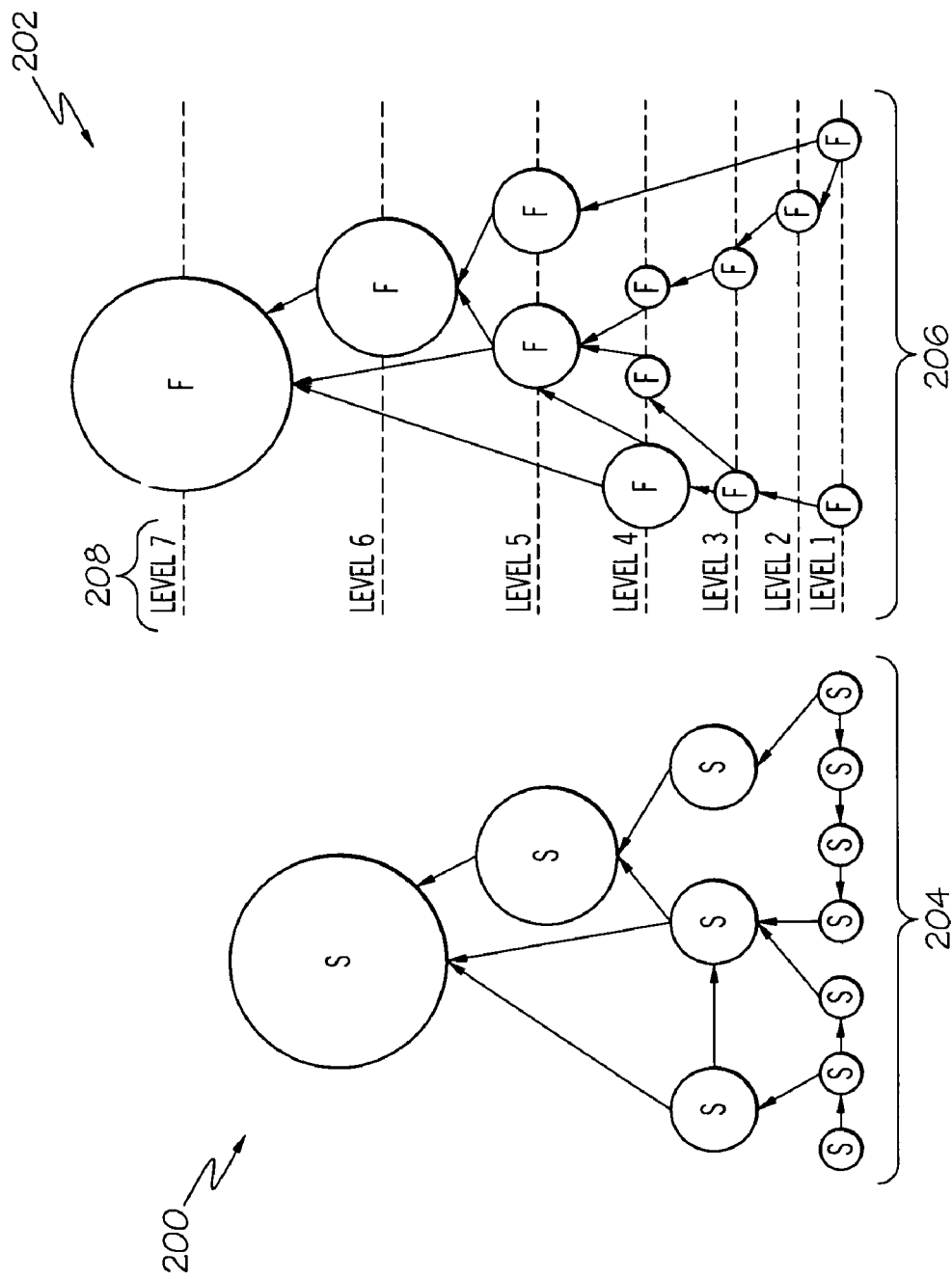
FIG. 2 is a functional block diagram of a sub-system hierarchy and a function hierarchy dependency tree that can be utilized in connection with the process of FIG. 1, in accordance with an exemplary embodiment of the present invention.

Step 112 is preferably repeated for each system function that could be affected by the particular failure modes being examined. In addition, in one preferred embodiment, if there is any uncertainty as to whether particular system functions are available, then a preliminary assessment is provided in step 114 or step 116 as to whether particular functions are likely to be available, along with an additional assessment in step 118 that there is uncertainty pertaining to the availability of the system function. Also in a preferred embodiment, the logical function reasoning in step 112 preferably utilizes a subsystem hierarchy and a function hierarchy dependency tree for each of various sub-systems of the system or vehicle, as described further below and as illustrated in FIG. 2. In addition, in a preferred embodiment, the logical function reasoning of step 112 is conducted by a processor, such as the processor 902 of FIG. 9 and described further below in connection therewith.

In addition, probabilistic function reasoning is conducted (step 120). In a preferred embodiment, the probabilistic function reasoning utilizes the failure mode probabilities of step 108 in assessing whether a particular system function is available. A plurality of failure mode probabilities for the various system functions are thereby generated in step from the probabilistic function reasoning based at least in part on the failure mode probabilities obtained in step 108 of the process 100.

The probabilistic function reasoning is preferably repeated for the different system functions. In one preferred embodiment, the probabilistic function reasoning is conducted for each system function that may be affected by the data. In another preferred embodiment, the probabilistic function reasoning is conducted for each system function for which a reading that the function status is unknown is made in step 118. The probabilistic function reasoning is triggered by any change in value of failure mode probabilities. In a preferred embodiment, the probabilistic function reasoning of step 120 is conducted by a processor, such as the processor 902 of FIG. 9 and described further below in connection therewith.

Next, the system functions are ranked (step 122). In a preferred embodiment, the system functions are ranked in order of importance, and are most preferably ranked in order of importance to the successful operation and maintenance of the system. In another preferred embodiment, the system functions are ranked in order of their associated failure mode probabilities.

Also in a preferred embodiment, failure mode probabilities are grouped in terms of fault conditions, a data structure that holds the failure modes and associated evidence. It is assumed that each fault condition only contains one fault (i.e., a single fault assumption), and that there may be a plurality of fault conditions active at any given time. However, this may vary in other embodiments. Also in a preferred embodiment, the ranking of the system functions in step 122 is conducted by a processor, such as the processor 902 of FIG. 9 and described further below in connection therewith. However, this may also vary in other embodiments.

Figure 3:
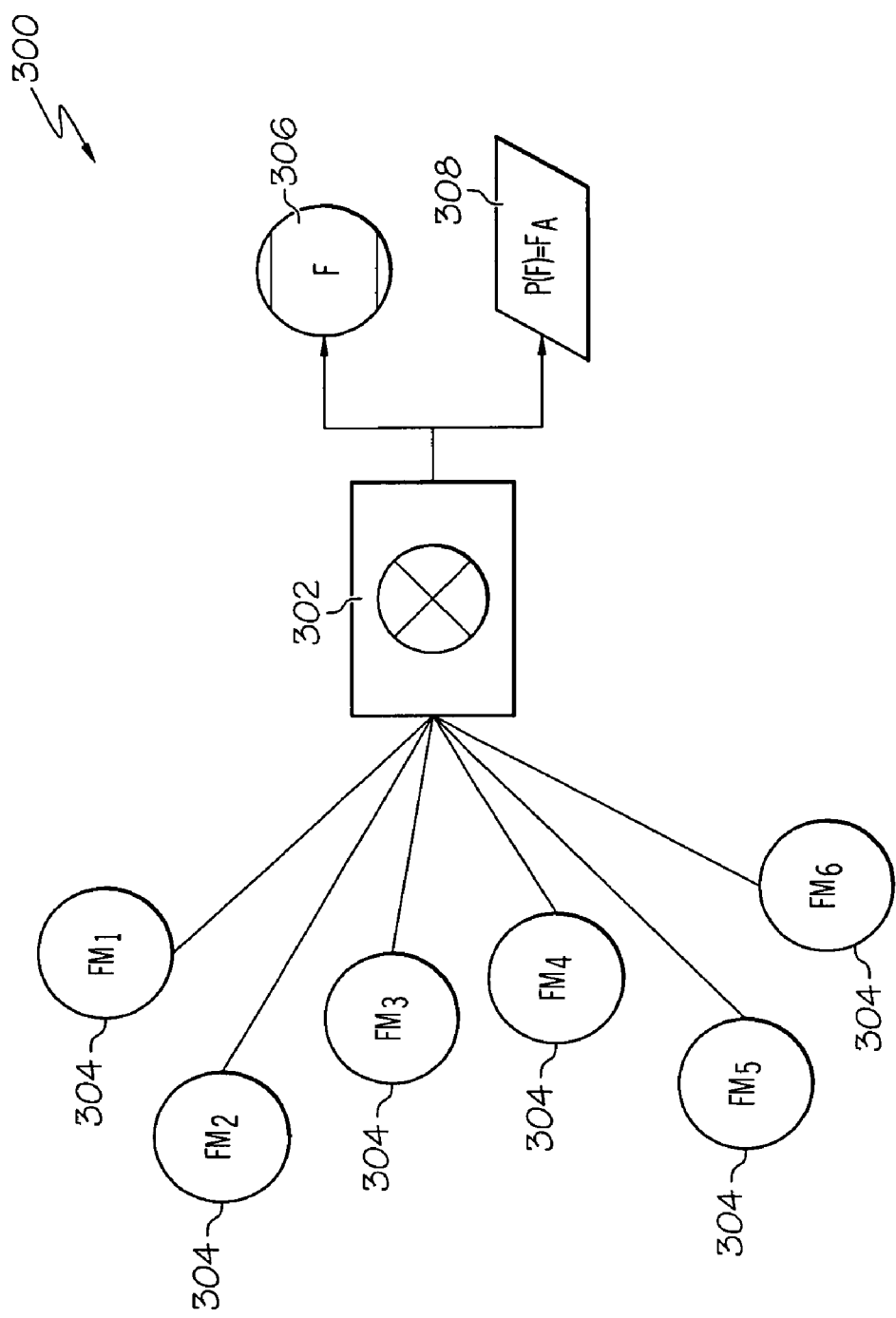
FIG. 3 is a functional block diagram of a fusion of multiple failure modes and a probabilistic function that can be utilized in connection with the process of FIG. 1, in accordance with an exemplary embodiment of the present invention.
Figure 4:
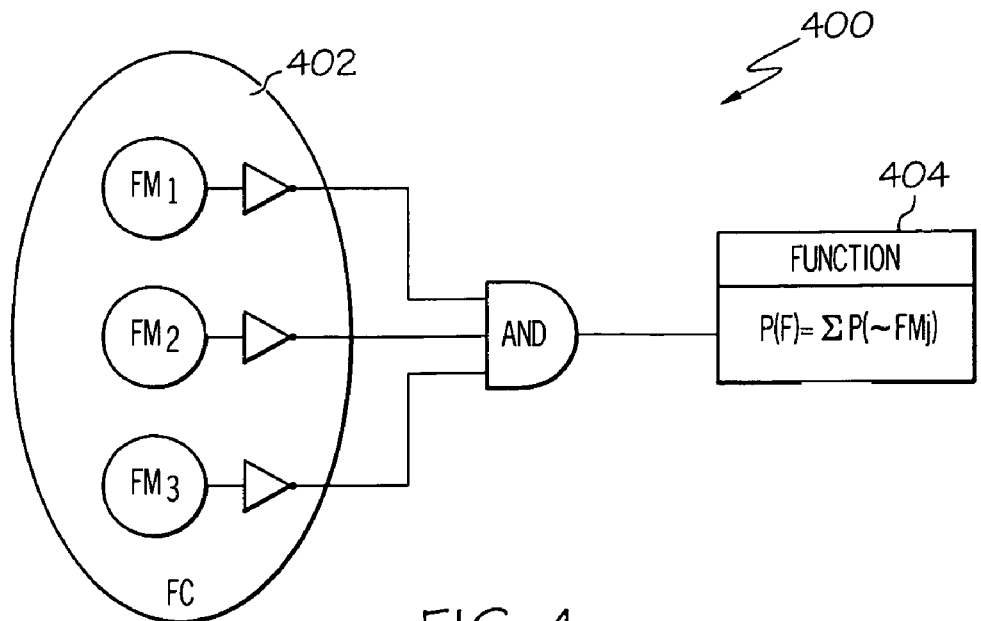
FIG. 4 is a logic diagram of contributory operations that can be utilized in connection with the process of FIG. 1, in accordance with an exemplary embodiment of the present invention.
Figure 5:
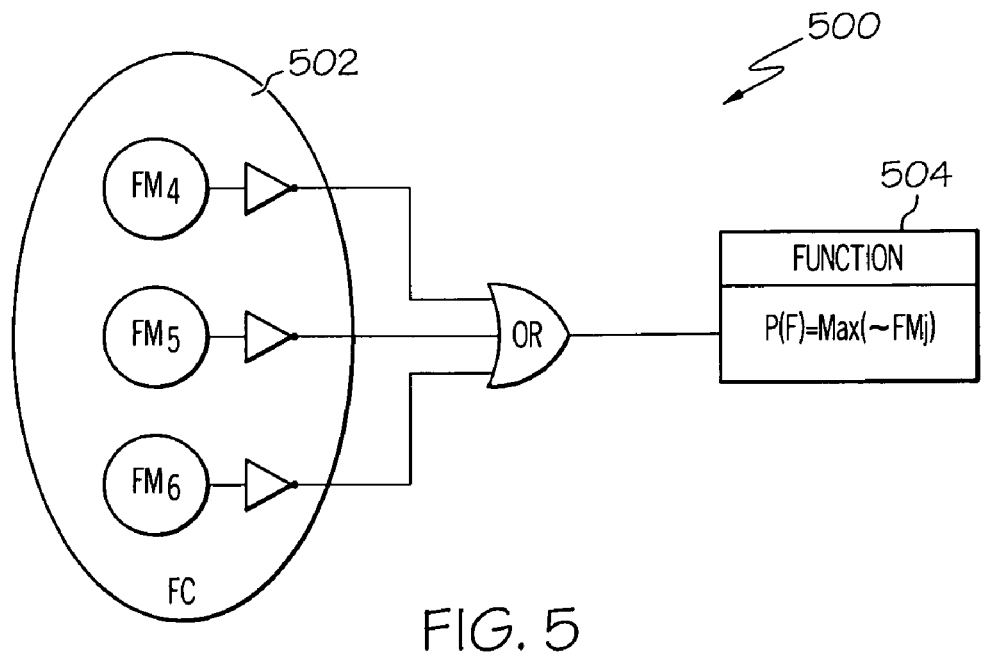
FIG. 5 is a logic diagram of redundancy operations that can be utilized in connection with the process of FIG. 1, in accordance with an exemplary embodiment of the present invention.

Next, determinations are made as to whether the various system functions are available or whether they have been lost (step 124). In a preferred embodiment, these determinations in step 124 are made based upon the probabilistic function reasoning of step 120. Also in a preferred embodiment, these determinations are made at least in part by fusing the failure mode probabilities of step 120 with the ranking information of step 122. In one exemplary embodiment, probabilistic loss of function is computed based upon failure mode probabilities contained in all active fault conditions. Various exemplary embodiments of such fusion techniques are depicted in FIGS. 3-5 and described further below in connection therewith.

In a preferred embodiment, step 124 includes an identification of various likely functions at least substantially lost by the system, based at least in part on the plurality of failure mode probabilities of step 120 and the rankings of step 122, as well as a calculations for each such likely functions that such likely functions have been lost by the system, based at least in part on the plurality of failure mode probabilities.

Also in a preferred embodiment, if it is determined in step 124 that a particular system function is available, then a function status: available reading is provided (step 126). Conversely, if it is determined in step 124 that a particular system function is not available, then a function status: unavailable reading is provided (step 128). In addition, if it is determined in step 124 that it is still unknown (or known only with a degree of certainty that is below a predetermined threshold value) whether a particular system function is available, then a system status: watch reading is provided (step 130).

Step 124 is preferably repeated for each system function for which a failure mode probability was calculated in step 120 and that was included in the ranking of step 126. Also in a preferred embodiment, the determinations of step 124 are conducted by a processor, such as the processor 902 of FIG. 9 and described further below in connection therewith.

In one preferred embodiment, preconditions to this processing are that connectivity information, modeled functions, and failure modes are compiled into function availability expressions. As noted above, two types of function expressions are identified: logical and probabilistic. Logical expressions are preferably executed upon changes in system variables, and output a tri-state result. Probabilistic expressions preferably execute when a failure mode probability changes, and output a real value between zero and one. The two basic types are compared in Table 1 directly below.

TABLE 1

Comparison of Logical and Probabilistic Function Expressions.

| Expression type | Execution trigger | Output |
| --- | --- | --- |
| Logical | Variable change | FA ∈ {T,F,UNK} |
| Probabilistic | FM probability change | FA ∈ [0,1] |

Also in a preferred embodiment, probabilistic expressions are generated by overloading the AND/OR operators on sub-expressions ("segments") of the logical expressions with the corresponding evidence fusion. Updated failure mode probabilities are to be processed with the function expression probability fusion. All other triggers will be processed with logical function expressions.

In addition, in a preferred embodiment, the logical computation flow of step 112 is triggered by any change of state of variables, functions or other logical constructs connected to functional availability. These may include sensors/monitors, other dependent functions, failure modes, environmental and consumable supply factors, user input failure conditions and others. The logical function reasoning preferably is conducted, and then preferably propagated through the function hierarchy dependency tree as detailed below.

Generation of the platform function hierarchy dependency tree preferably results in "level" assignments to functions in step 122. This structure in turn preferably determines the order of evaluation of logical function assessment. Each level of the function hierarchy dependency tree comprises functions for which there are no interconnections between corresponding physical subsystems.

FIG. 2 is a functional block diagram of a sub-system hierarchy 200 and a function hierarchy dependency tree 202 for a vehicle or other system, and that can be utilized in connection with the process 100 of FIG. 1, in accordance with an exemplary embodiment of the present invention. Specifically, in accordance with a preferred embodiment, FIG. 2 depicts an exemplary sub-system hierarchy 200 and function hierarchy dependency tree 202 that can be generated in step 122 of the process 100 of FIG. 1. As shown in FIG. 2, the left-hand side presents an abstract view of an exemplary sub-system hierarchy 200 of various subsystems 204 of different levels 208 of the system or vehicle. On the right-hand side of FIG. 2, the function hierarchy dependency tree 202 constructed from this sub-system hierarchy 200 is shown. The function hierarchy dependency tree 202 represents a hierarchical determination of various system functions 206 pertaining to the vehicle or system in question in FIG. 2 in accordance with the various levels 208 thereof.

In accordance with an exemplary embodiment in which the system at issue is a vehicle, one such example of a function hierarchy is a vehicle's main function of "Move", which is dependent upon the electrical subsystem's ability to provide sufficient electrical power to the spark plugs in the engine subsystem such that the engine can provide combustion. Combustion is also dependent on the fuel subsystem's ability to supply fuel. Further down in the hierarchy, the electrical subsystem's supply of adequate power is dependent upon the battery's ability to supply current. The fuel subsystem is dependent upon the fuel pump's ability to provide pressure to deliver the fuel which in turn is dependent upon the fuel tank containing a sufficient quantity of the consumable supply; fuel, and electrical power being available from the electrical subsystem to drive the pump. Having adequate combustion provides torque to the drive train; another subsystem which has functions to deliver motive force to the drive wheels and hence also contributing to the vehicle function, "Move". It will be appreciated that the function hierarchy may vary in various embodiments.

In a preferred embodiment, the function hierarchy dependency tree 202 is introduced and utilized in the probabilistic function reasoning of step 120 and the ranking of functions in step 122 of the process 100 of FIG. 1 in order to increase the efficiency of computation and modification of function states. In addition, the function hierarchy dependency tree 202 can also be used in these and/or other steps of the process 100 of FIG. 1 in order to propagate uncertainty.

FIG. 3 is a functional block diagram of a fusion 300 of multiple failure modes 304 and a probabilistic function 308 that can be utilized in connection with the process 100 of FIG. 1, in accordance with an exemplary embodiment of the present invention. In a preferred embodiment, fusion algorithms 302 (preferably stored in a memory and/or computer readable medium, such as the memory 904 and/or the program 906 of FIG. 9) are used for combining evidence in scenarios, such as the one depicted in FIG. 3, in accordance with the step of making the determinations as to various system function availabilities in step 124 of the process 100 of FIG. 1.

Specifically, in accordance with a most preferred embodiment of the present invention, a function expression 306 is constructed from the fusion algorithms 302, the failure modes 304, and the probabilistic function 308, in terms of failure modes that nevertheless reflect the likelihood of the presence of redundancies. An example of failure mode redundancy might involve the requirement for logically "OR-ing" together failure modes representing redundant starter batteries. This redundancy introduces uncertainty into the functional availability expressions. Here, the function F 308 and its functional availability 306

$$P(F) = F_A$$

are symbolically represented as output from the fusion process in a preferred embodiment of the present invention.

In different preferred embodiments, the fusion process can be performed with function redundancy using "AND" logic for the function probabilities (as illustrated in FIG. 4 and described directly below in accordance with one exemplary embodiment of the present invention), or alternatively without function redundancy using "OR" logic probabilities (as illustrated in FIG. 5 and described further below in accordance with another exemplary embodiment of the present invention). In addition, as noted above, in one exemplary embodiment, probabilistic loss of function is computed based upon failure mode probabilities contained in all active fault conditions.

Turning first to FIG. 4, a first logic diagram 400 is provided in FIG. 4 of contributory operations that can be utilized in connection with the process 100 of FIG. 1 using function redundancy using "AND" logic for the function probabilities, in accordance with an exemplary embodiment of the present invention. As shown in FIG. 4, in this exemplary embodiment, in the fusion process different failure mode probabilities 402 for corresponding system functions are aggregated together using "AND" logic, so that an aggregate probability function 404 determines that a probability of an aggregate function is based upon the aggregation using "AND" logic of the inverse of the various individual failure mode probabilities 402 of the various individual system functions that may have an overall or combined effect on the aggregate function at issue.

For example, in one such exemplary embodiment, equations 1a and 1b below represent an algorithm (preferably stored in a computer readable medium and/or a memory, such as the disk 912 and/or the memory 904 of FIG. 9) for combining evidence with "AND" logic to compute functional availability F 306. These are to be applied when there are no redundancies in the set of failure modes $\{FM_i\}$.

$$P(\sim F | \{FM_i\}) = 1 - \prod_i (1 - P(FM_i)) \quad (1a)$$

$$P(F | \{FM_i\}) = \prod_i (1 - P(FM_i)) \quad (1b)$$

Turning first to FIG. 5, a second logic diagram 400 is provided in FIG. 5 of contributory operations that can be utilized in connection with the process 100 of FIG. 1 without using function redundancy, and instead using "OR" logic for the function probabilities, in accordance with an exemplary embodiment of the present invention. As shown in FIG. 5, in this exemplary embodiment, in the fusion process different failure mode probabilities 502 for corresponding system functions are aggregated together using "OR" logic, so that an aggregate probability function 504 determines that a probability of an aggregate function is based upon the aggregation using "OR" logic of the inverse of the various individual failure mode probabilities 502 of the various individual system functions that may have an overall or combined effect on the aggregate function at issue.

In yet other exemplary embodiments, fuzzy logic can be used to determine the minimum and maximum bounds indicated in Equations 2a-2b (fuzzy "OR") and 3a-3b (fuzzy "AND"). Both equations account for potential redundancies in the failure mode set.

$$P_{min}(\sim F | \{FM_i\}) = \text{Max}(P_{min}(FM_i)) \quad (2a)$$

$$P_{max}(\sim F | \{FM_i\}) = \text{Max}(P_{max}(FM_i)) \quad (2b)$$

$$P_{min}(\sim F | \{FM_i\}) = \text{Min}(P_{min}(FM_i)) \quad (3a)$$

$$P_{max}(\sim F | \{FM_i\}) = \text{Min}(P_{max}(FM_i)) \quad (3b)$$

As mentioned above, in a preferred embodiment, the probabilistic function reasoning utilizes a single fault assumption within a given fault condition, but that allows for simultaneous faults to be present across multiple fault conditions. However, this may vary in other embodiments. The single fault assumption (SFA) states that there is only one failure mode per fault condition. Also as mentioned above, in one exemplary embodiment, probabilistic loss of function is computed based upon failure mode probabilities contained in all active fault conditions.

Failure mode probabilities will now be considered directly below using this single fault assumption. Given a set of failure modes $$\{FM_i, i=1, Kn\}$$

with corresponding probabilities $$\{P(FM_i)|E\}$$

that have been calculated by fault propagation simulator reasoning processes based on evidence E. In general, the sum of these probabilities may not be unity. We are interested in the computing probabilities of existence of each failure mode $FM_j$ predicated on the evidence and the applied constraint single fault assumption, or $$\{P(FM_j)|E, SFA\}$$

In accordance with a preferred embodiment, we further assume that all failure modes within a given fault condition are independent. The resultant failure mode probability is given by $$P(FM_j | SFA) = \frac{P(FM_j) \prod_{i=1, i \neq j}^{n} [1 - P(FM_i)]}{\delta + \sum_{k=1}^{n} P(FM_k) \prod_{i=1, i \neq k}^{n} [1 - P(FM_i)]} \quad (4)$$

where the "leak" factor $\delta$, which accounts for modeling errors, is written $$\delta = \delta_0 \prod_{i=1}^{n} [1 - P(FM_i)] \quad (5)$$

In Equation 4, $\delta$ is a means to incorporate the remote possibility that none of the failure modes in the set $\{FM_i\}$ is associated with the actual fault.

Also in a preferred embodiment, the process of ranking uses bounds set on failure mode probabilities (upper and lower) to compute upper and lower probability bounds on a fault assumption. These two lists (P(FM) and FA) are subsequently fused as part of step 124 of the process 100 of FIG. 1 using a voting algorithm known as "Borda Counting". The declaration of functional loss is a rank-dependent expected utility that incorporates function criticality, mission, and maintenance costs.

The Borda Count method preferably uses all the preference information in a preference schedule. An exemplary MATLAB script implementation of the Borda Count method for ranking two lists in step 122 of the process 100 of FIG. 1 is provided in FIG. 6 in accordance with an exemplary embodiment of the present invention.

The rankings are preferably updated for all elements/functions of the list, even when partial changes occur to function availability probabilities. Relative rankings assist in maintenance prioritization, mission adjustment, or in the declaration of function loss.

In a preferred embodiment, practical computation of functional availability under an assumption that a single fault exists within a fault condition, but that multiple faults may exist across different fault conditions, can be conducted in accordance with either of two practical cases for combination of evidence, as follows:

1. Multiple failure modes contained in one fault condition affect the function (i.e., where there is a single fault condition);
2. Multiple fault conditions contain (one or more) failure modes that affect the function (i.e., a multiple fault scenario).

With reference again to FIG. 4, in the first case of multiple failure modes and one fault condition, multiple failure modes contained in one fault condition affect the function. A single fault assumption implies that the failure modes within a fault condition are mutually exclusive. There are two basic evidence fusion operations to consider, based on the underlying failure mode-function relationship for which a fault assumption is being computed. The failure mode operations are either contributory or redundant. In contributory operations, all failure modes must be inactive in order for the function to be available. This is suggested in FIG. 4 (discussed above). For this case, the functional availability is computed according to Equation 6.

$$P(F) = \sum_{j} P(\sim FM_j) \quad (6)$$

With reference again to FIG. 5, also in a preferred embodiment, redundant operations require the presence of only a single inactive failure mode to ensure functional availability, as is depicted in FIG. 5. The expression used for a fault assumption computation in this situation is a "max" operation on the set of candidate failure modes, as expressed in Equation 7.

$$P(F) = \text{Max}(\sim FM_j) \quad (7)$$

In a preferred embodiment, when multiple fault conditions include failure modes affecting the function in question, the functional availabilities computed for each fault condition considered independently must be combined. In this scenario, the probabilities are preferably computed for each fault condition must be normalized with respect to one another prior to this combination given that a single fault assumption no longer applies. Single fault assumptions within each fault condition are preferably used to effect this normalization in accordance with an exemplary embodiment of the present invention. As mentioned above, in one exemplary embodiment, probabilistic loss of function is computed based upon failure mode probabilities contained in all active fault conditions.

Figure 7:
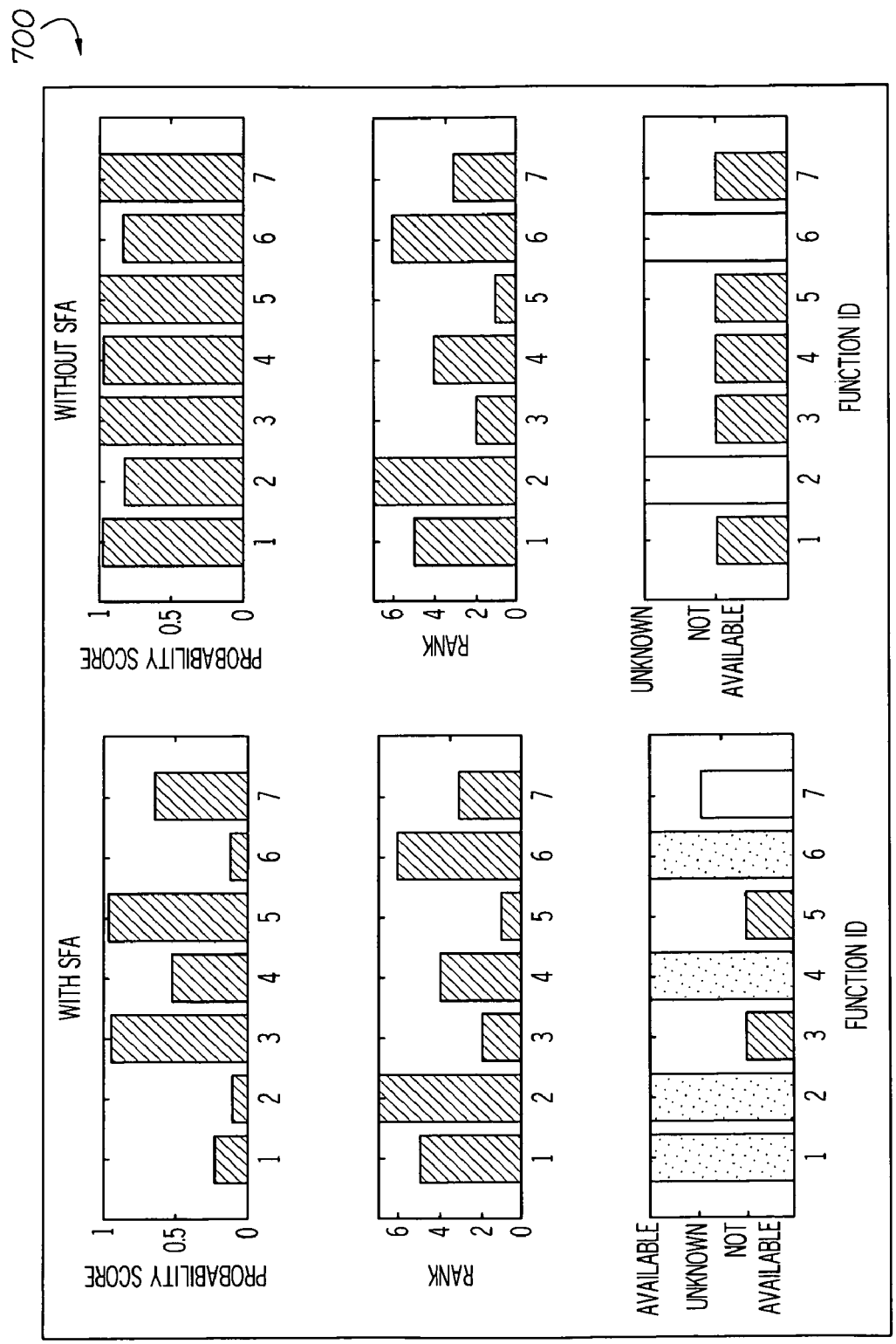
FIG. 7 is a series of bar diagrams displaying exemplary simulation results using the process of FIG. 1, in accordance with an exemplary embodiment of the present invention.

FIG. 7 is a series of bar diagrams 700 displaying exemplary simulation results using the process 100 of FIG. 1, in accordance with an exemplary embodiment of the present invention. In a preferred embodiment, declaration of loss of function under ambiguity can be simulated by applying simple threshold values to the computed function probabilities. Specifically, FIG. 7 shows an exemplary simulation result snapshot for two computation techniques; one utilizing a single fault assumption, and the other without a single fault assumption. The figure shows unavailability probabilities for seven functions. The function state declaration results are categorized as follows: "Available", "Unavailable", and "Unknown". The value of the applied threshold is preferably a function of statistical properties of failure mode probability distributions, the methods used for their computation, and their grouping within fault conditions.

In addition, in experiments conducted in connection with an exemplary embodiment of the present invention, the optimal threshold value was also found to be influenced by the richness of the function expression encapsulation of failure modes and their inner relationships. During these experiments, the following threshold intervals were used for the "Unknown" state: (0.8, 0.9) without a single fault assumption, and (0.6, 0.7) with a single fault assumption. The probability score reflects the probability of a function being unavailable. The ranking (computed with the Borda Count method of FIG. 6) is in ascending order, from most likely unavailable to most likely available.

Figure 8:
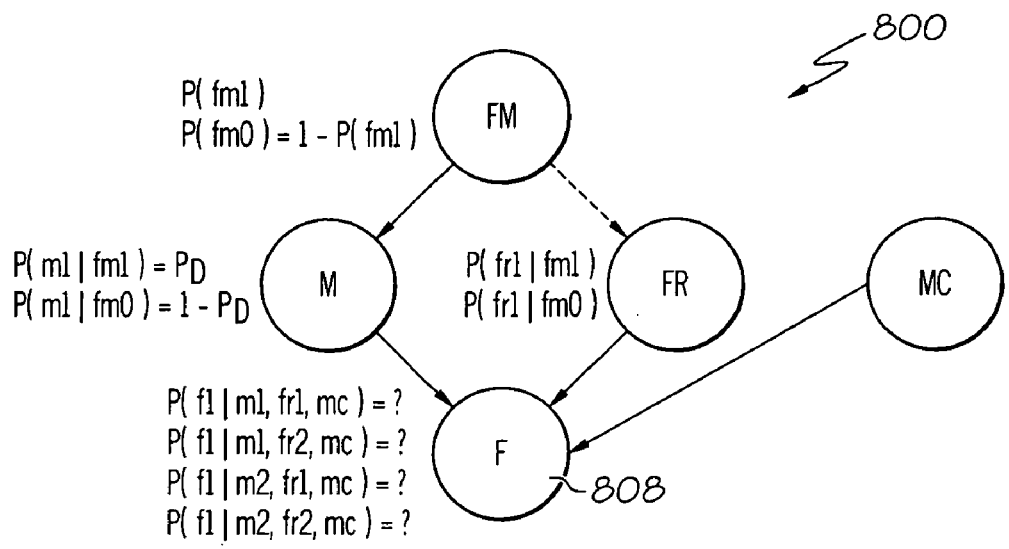
FIG. 8 is a functional block diagram of a Bayesian network that can be utilized in connection with the process of FIG. 1, in accordance with an exemplary embodiment of the present invention.

FIG. 8 is a functional block diagram of a Bayesian network 800 that can be utilized in connection with the process 100 of FIG. 1, in accordance with an exemplary embodiment of the present invention. Such a Bayesian network 800 is another technique that can be used for declaration of function loss in an exemplary embodiment. It will be understood that a Bayesian network is a graphical model that encodes probabilistic relationships among variables of interest. This approach may be preferred because of its natural ability to include multivariate numerical and categorical data inputs (such as mission criticality) into the loss of function declaration. Models may be inserted at discrete nodes in the network, such as a rank-dependent expected utility model, or even another type of empirically-based classifier.

An illustrative example of a Bayesian network 800 that may be used to estimate functional availability using required function and failure mode input data is represented in FIG. 8. One or more other Bayesian networks and/or other types of networks and/or techniques may be used in other embodiments of the present invention. As shown in the graph of FIG. 8, the structure of this graph reflects the expert's insight on how the important variables (nodes) are causally related to one another. In the figure the variables are: M (monitors), FM (failure modes), FR (required functions), F (function of interest) and MC (criticality of mission. The dependencies between variables are as indicated by the edges between the nodes: failure modes cause the activation of monitors, resulting in changes to the availability of function F. The required functions FR have some causal effect on F, however they are not necessarily associated with the failure modes FM, as suggested by the dashed link in the figure. In FIG. 8, each node in the network has been annotated to include probability values for its associated variable. MC is a constant value that influences the fault assumption calculation by providing a scalar factor to the list of conditioning variables.

A distinct advantage of the Bayesian approach is that highly uncertain—even missing data—are readily handled. This means that failure modes do not need to be isolated in order to reliably compute functional availability in a dynamic setting, given the available evidence E:

$$P(F|E)$$

Also in conjunction with an exemplary embodiment of the present invention, the following table (Table 2) below includes a list of variables utilized in connection with the example of FIG. 8:

TABLE 2

Variables for the example of FIG. 8:

| Variable | Variable name | Value | Interpretation of value |
|---|---|---|---|
| FM | Failure mode | fm1 | Failure mode active |
| | | fm0 | Failure mode inactive |

TABLE 2-continued

Variables for the example of FIG. 8:

| Variable | Variable name | Value | Interpretation of value |
|---|---|---|---|
| M | Monitor | m1 | Monitor active |
|  |  | m0 | Monitor inactive |
| FR | Required function | fr1 | Req'd function availability |
|  |  | fr0 | Req'd function unavailability |
| MC | Mission criticality | mc | Mission criticality (constant value) |
| F | Function | f1 | Function availability |
|  |  | f0 | Function unavailability |

Figure 9:
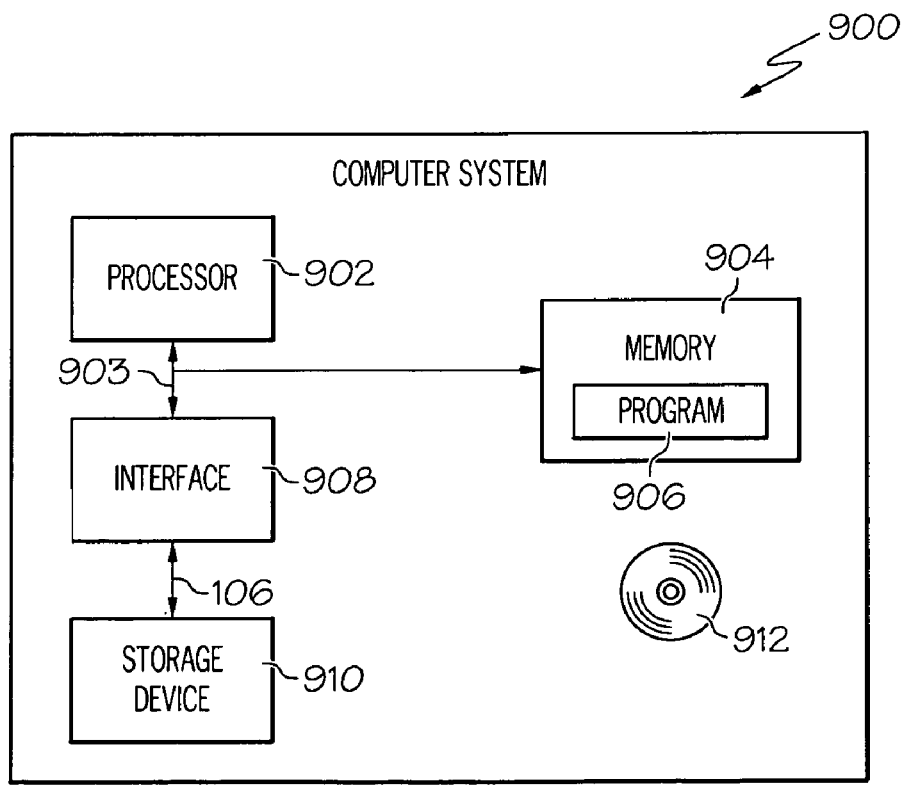
FIG. 9 is a functional block diagram of a computer system that can be implemented in connection with the process of FIG. 1, in accordance with an exemplary embodiment of the present invention.

FIG. 9 is a functional block diagram of a computer system 900 that can be implemented in connection with the process 100 of FIG. 1, in accordance with an exemplary embodiment of the present invention. In the depicted embodiment, the computer system 900 includes a processor 902, a memory 904, a computer bus 903, an interface 908, and a storage device 910. The processor 902 performs the computation and control functions of the computer system 900 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 902 executes one or more programs 906 preferably stored within the memory 904 and, as such, controls the general operation of the computer system 900.

As referenced above, the memory 904 stores a program or programs 906 that execute one or more embodiments of processes such as the process 100 described below in connection with FIG. 1 and/or various steps thereof and/or other processes, such as those described elsewhere herein. The memory 904 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 904 may be a single type of memory component, or it may be composed of many different types of memory components. In addition, the memory 904 and the processor 902 may be distributed across several different computers that collectively comprise the computer system 900. For example, a portion of the memory 904 may reside on a computer within a particular apparatus or process, and another portion may reside on a remote computer. Also in a preferred embodiment, the memory 904 may also store the operating data for the vehicle or other system and/or various probabilities, rankings, determinations, and/or other values used or provided by the processor 902 and/or other components of the computer system 900.

The computer bus 903 serves to transmit programs, data, status and other information or signals between the various components of the computer system 900. The computer bus 903 can be any suitable physical or logical means of connecting computer systems and components. This includes, but is not limited to, direct hard-wired connections, fiber optics, infrared and wireless bus technologies.

The interface 908 allows communication to the computer system 900, for example from a system operator, and/or another computer system, and can be implemented using any suitable method and apparatus. The interface 908 can include one or more network interfaces to communicate within or to other systems or components, one or more terminal interfaces to communicate with technicians, and one or more storage interfaces to connect to storage apparatuses such as the storage device 910. Also in a preferred embodiment, the interface 908 obtains the operating data pertaining to the vehicle or other system and provides the operating data to the processor 902 for processing.

The storage device 910 can be any suitable type of storage apparatus, including direct access storage devices such as hard disk drives, flash systems, floppy disk drives and optical disk drives. In one exemplary embodiment, the storage device 910 is a program product from which memory 904 can receive a program 906 that executes one or more embodiments of the process 100 of FIG. 1 and/or steps thereof as described in greater detail further below. In one preferred embodiment, such a program product can be implemented as part of, inserted into, or otherwise coupled to the computer system 900. As shown in FIG. 9, the storage device 910 can comprise a disk drive device that uses disks 912 to store data. As one exemplary implementation, the computer system 900 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 912), and transmission media such as digital and analog communication links. It will similarly be appreciated that the computer system 900 may also otherwise differ from the embodiment depicted in FIG. 9, for example in that the computer system 900 may be coupled to or may otherwise utilize one or more remote computer systems and/or other control systems.

Accordingly, improved systems, program products, and methods are provided. The improved systems, program products, and methods provide for improved computations of loss of function of vehicles or other systems, for example that better incorporates uncertainties stemming from the data or from other services.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for determining a probabilistic loss of function of a system, the method comprising the steps of:
   determining, using a processor, a plurality of failure mode probabilities;
   ranking, using the processor, a plurality of functions pertaining to the failure mode probabilities; and
   identifying, using the processor, a likely function that is most likely to be at least substantially lost by the system, based at least in part on the plurality of failure mode probabilities and the ranking.

2. The method of claim 1, further comprising the steps of:
calculating a likelihood that the likely function has been lost by the system, based at least in part on the plurality of failure mode probabilities.

3. The method of claim 2, further comprising the steps of:
identifying one or more additional likely functions at least substantially lost by the system, based at least in part on the plurality of failure mode probabilities and the ranking; and
calculating a plurality of additional likelihoods that the additional likely functions have been lost by the system, based at least in part on the plurality of failure mode probabilities.

4. The method of claim 1, wherein the step of ranking the plurality of functions pertaining to the failure mode probabilities comprises the step of ranking the plurality of functions pertaining to the failure mode probabilities using a subsystem hierarchy and a function hierarchy dependency tree related thereto.

5. The method of claim 1, wherein the step of identifying the likely function comprises the step of fusing the plurality of failure mode probabilities with the ranking.

6. The method of claim 1, wherein the likely function is determined using an aggregate probability for the likely function across multiple failure modes.

7. The method of claim 1, further comprising the step of:
obtaining operating data pertaining to the system;
wherein the step of identifying the likely function comprises the step of identifying, using the processor, the likely function based at least in part on the plurality of failure mode probabilities and the ranking without determining which failure mode is present.

8. A non-transitory computer readable medium encoded with a program product for determining a probabilistic loss of function of a system, the program product comprising:
a program configured to at least facilitate:
determining a plurality of failure mode probabilities;
ranking a plurality of functions pertaining to the failure mode probabilities; and
identifying a likely function that is most likely to be at least substantially lost by the system, based at least in part on the plurality of failure mode probabilities and the ranking; and
a non-transitory computer-readable signal bearing medium bearing the program.

9. The non-transitory computer readable medium of claim 8, wherein the program is further configured to at least facilitate:
calculating a likelihood that the likely function has been lost by the system, based at least in part on the plurality of failure mode probabilities.

10. The non-transitory computer readable medium of claim 9, wherein the program is further configured to at least facilitate:
identifying one or more additional likely functions at least substantially lost by the system, based at least in part on the plurality of failure mode probabilities and the ranking; and
calculating a plurality of additional likelihoods that the additional likely functions have been lost by the system, based at least in part on the plurality of failure mode probabilities.

11. The non-transitory computer readable medium of claim 8, wherein the program is further configured to at least facilitate ranking the plurality of functions pertaining to the failure mode probabilities using a subsystem hierarchy and a function hierarchy dependency tree related thereto.

12. The non-transitory computer readable medium of claim 8, wherein the program is further configured to at least facilitate identifying the likely function at least substantially lost by the system based at least in part on the plurality of failure mode probabilities and the ranking by fusing the plurality of failure mode probabilities with the ranking.

13. The non-transitory computer readable medium of claim 8, wherein the likely function is determined using an aggregate probability for the likely function across multiple failure modes.

14. The non-transitory computer readable medium of claim 8, wherein the program is further configured to at least facilitate:
identifying the likely function based at least in part on the plurality of failure mode probabilities and the ranking without knowing the failure mode.

15. A computer system for determining a probabilistic loss of function of a system, the computer system comprising:
an interface configured to at least facilitate obtaining operating data for the system; and
a processor coupled to the interface and configured to:
determine a plurality of failure mode probabilities based at least in part on the operating data;
rank a plurality of functions pertaining to the failure mode probabilities; and
identify a likely function that is most likely to be at least substantially lost by the system, based at least in part on the plurality of failure mode probabilities and the ranking.

16. The computer system of claim 15, wherein the processor is further configured to:
calculate a likelihood that the likely function has been lost by the system, based at least in part on the plurality of failure mode probabilities.

17. The computer system of claim 16, wherein the processor is further configured to:
identify one or more additional likely functions at least substantially lost by the system, based at least in part on the plurality of failure mode probabilities and the ranking; and
calculate a plurality of additional likelihoods that the additional likely functions have been lost by the system, based at least in part on the plurality of failure mode probabilities.

18. The computer system of claim 15, wherein the processor is further configured to identify the likely function at least substantially lost by the system based at least in part on the plurality of failure mode probabilities and the ranking by fusing the plurality of failure mode probabilities with the ranking.

19. The computer system of claim 18, wherein the processor is further configured to identify the likely function based at least in part on the plurality of failure mode probabilities and the ranking regardless of the failure mode.

20. The computer system of claim 15, wherein the processor is further configured to rank the plurality of functions pertaining to the failure mode probabilities using a subsystem hierarchy and a function hierarchy dependency tree related thereto.

* * * * *